United States Patent [19]
Macpherson et al.

[11] 3,832,786
[45] Sept. 3, 1974

[54] APPARATUS FOR TESTING FRONT WHEEL ALIGNMENT OF AUTOMOTIVE VEHICLES

[75] Inventors: Roger Macpherson; Pierre A. Alsina, both of Rochester, N.Y.

[73] Assignee: American Tatra, Inc., Rochester, N.Y.

[22] Filed: Aug. 11, 1972

[21] Appl. No.: 279,849

[52] U.S. Cl.................. 33/288, 33/203.18, 356/155
[51] Int. Cl. ............................................. G01b 5/25
[58] Field of Search ........ 33/288, 203.18, 337, 336; 356/155

[56] References Cited
UNITED STATES PATENTS

| | | | |
|---|---|---|---|
| 2,410,339 | 10/1946 | Creagmile............................ | 356/155 |
| 3,402,905 | 9/1968 | MacMillan....................... | 33/203.18 |
| 3,666,369 | 5/1972 | Carrigan............................... | 33/288 |
| 3,685,161 | 8/1972 | Macpherson ......................... | 33/288 |

*Primary Examiner*—William D. Martin, Jr.

[57] ABSTRACT

Two, spaced, parallel rollers are mounted for limited vertical movement in a garage floor to engage and support the two front wheels of an automotive vehicle. At least one of the rollers can be driven to impart rotation to the wheels. Two tubular members, each containing a light bulb, are mounted by clamps on the outside of the wheels for rotation thereby, to project beams of light onto concave charts that are positioned beyond opposite ends of the rollers. A spring-loaded center in each tubular member is fulcrumed in the recess in the outer end of the turning spindle on which each wheel is mounted, so that as each member rotates, it may be pivoted. Its beam of light will trace a curvelinear path on the associated chart, if the spindle and wheel are misaligned. The position of the light beam on each chart is indicative of the toe-in and camber of the associated wheel. A lever pivoted on the floor is engageable with each tubular member to shift it into alignment with the associated spindle, so that the beam of light forms a stationary spot on the associated chart.

10 Claims, 10 Drawing Figures

APPARATUS FOR TESTING FRONT WHEEL ALIGNMENT OF AUTOMOTIVE VEHICLES

This invention relates to apparatus for testing the alignment of the front wheels of automotive vehicles.

It is impossible to check correctly the alignment of the front wheels of an automotive vehicle unless the compression pressure on the tie rods of the vehicle is the same as when the vehicle is in motion. With most prior apparatus used for checking front wheel alignment, the wheels of a vehicle are stationary during the test period; and consequently the results do not duplicate the conditions encountered when the automobile is in use. Moreover, most such prior testing apparatus has been relatively complicated and costly, and, in essence, has been incapable of consistently producing accurate tests.

A primary object of this invention is to provide improved apparatus for testing the alignment of the front wheels of automotive vehicles while the wheels are turning.

Another object of this invention is to provide testing apparatus of the type described, which will produce accurate results regardless of the amount of misalignment or wobble in the wheels being tested.

Another object of this invention is to provide improved apparatus of the type described which enables the camber and toe of each tested wheel to be read simultaneously on the same chart.

Still another object of this invention is to provide novel gauging means for use in accurately assembling and adjusting testing apparatus of the type described.

Other objects of the invention will be apparent hereinafter from the specification and from the recital of the appended claims, particularly when read in conjunction with the accompanying drawings.

Referring now to the drawings by numerals of reference, 20 and 21 (FIGS. 1 and 3) denote a pair of spaced, parallel rollers, opposite ends of which are journaled in two pairs of laterally spaced pillow blocks 24, which support the rollers transversely over an opening or pit P (broken lines in FIG. 1) formed in the floor F of a garage or the like.

Shallow recesses 23 (FIGS. 2A and 3) are formed in the floor at opposite sides of the pit; and mounted in the floor beneath each such recess is a housing 26. Two, spaced, parallel racks 27 are mounted in each housing 26 adjacent the front and back thereof, respectively, for vertical sliding movement. Each rack projects through an opening 28 in the cover 29 of a housing and is fastened rigidly to the underside of a block 24 that supports the adjacent end of a roller 20, 21. Two further racks 30 are secured in each housing 26 at diametrally opposite sides of a cylinder 32, which is mounted for vertical reciprocation in each housing 26. A fixed piston 31 is mounted in each cylinder 32 and has attached thereto a rod 33, which projects out of the upper end of the cylinder 32, and is threaded in the cover 29 of the associated housing 26. The racks 30 project at their upper ends slidably through registering openings 34 (FIG. 3) in the top of each housing 26; and each pair of racks 30 is fastened to the underside of a horizontally disposed plate 36, which extends into the space between the rollers 20 and 21. Each plate 36 carries a circular tire pad 38, which is rotatable on plate 36, and which is slidably adjustable thereon in a direction parallel to the rollers 20 and 21 for the purpose described hereinafter.

Figures 1, 3:
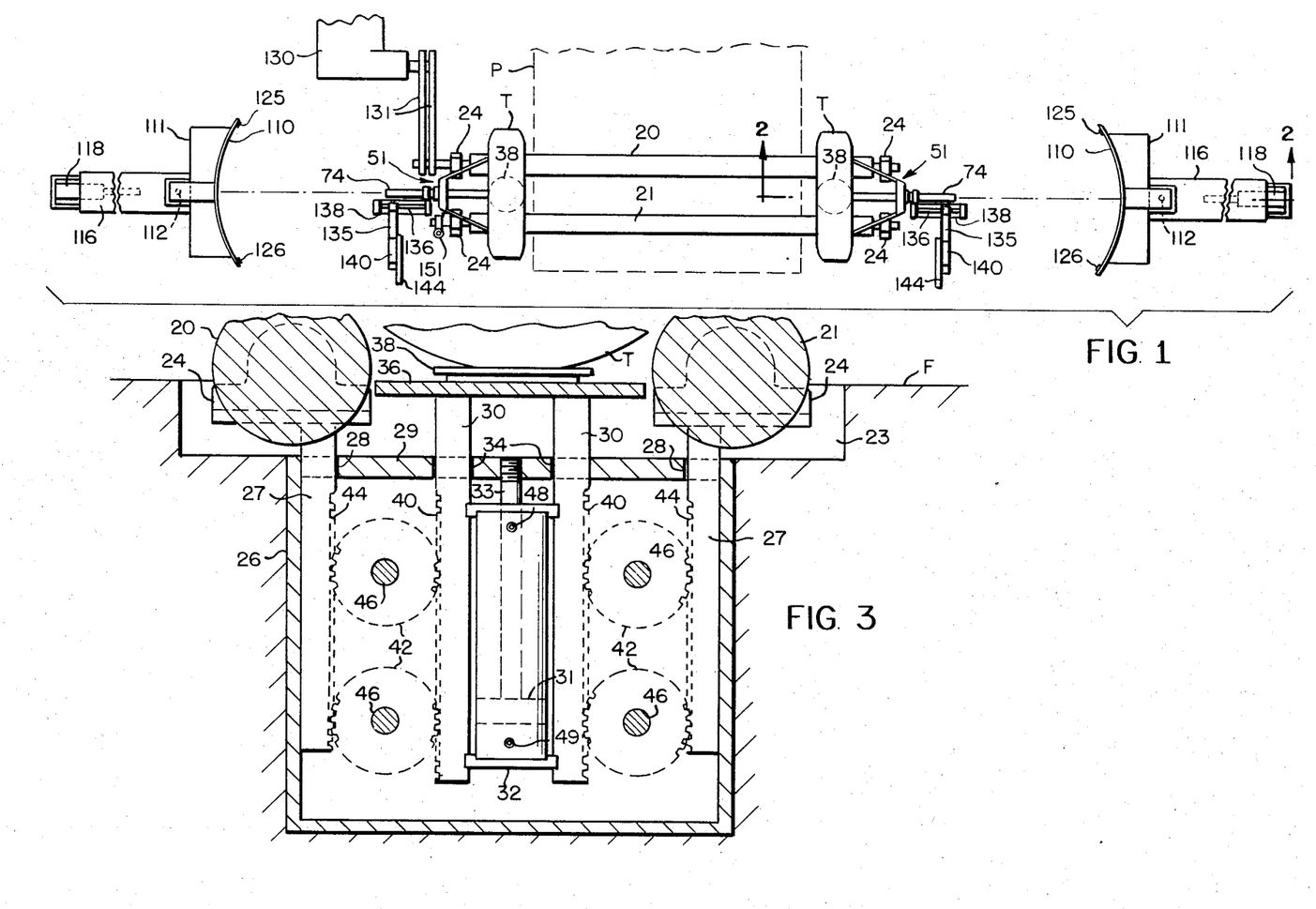
FIG. 1 is a fragmentary plan view of apparatus made in accordance with one embodiment of this invention for testing the alignment of front wheels of automotive vehicles.
FIG. 3 is a still further enlarged, fragmentary sectional view taken along the line 3—3 in FIG. 2A looking in the direction of the arrows.

Each rack 30 has on one side teeth 40, which mesh with a pair of vertically spaced pinions 42 which mesh, in turn, with teeth 44 that are formed on the inside surfaces of the racks 27. The gears 42 are secured to four spaced, parallel idler shafts 46, which are journaled at opposite ends in opposite sides of each housing 26.

Each hydraulic cylinder 32 has fluid inlet-outlet ports 48 and 49, respectively, which communicate with the cylinder at opposite sides, respectively of its piston. By feeding the motive fluid to the ports 48 and exhausting it from the ports 49, the cylinders are driven upwardly, elevating racks 30 and pads 38, and lowering racks 27 and rollers 20 and 21. Conversely, when fluid is supplied to the ports 49 and exhausted from the ports 48, the racks 30 and the plates 36 and 38 are lowered, while the racks 27, blocks 24, and rollers 20 and 21 are elevated.

Figure 2A:
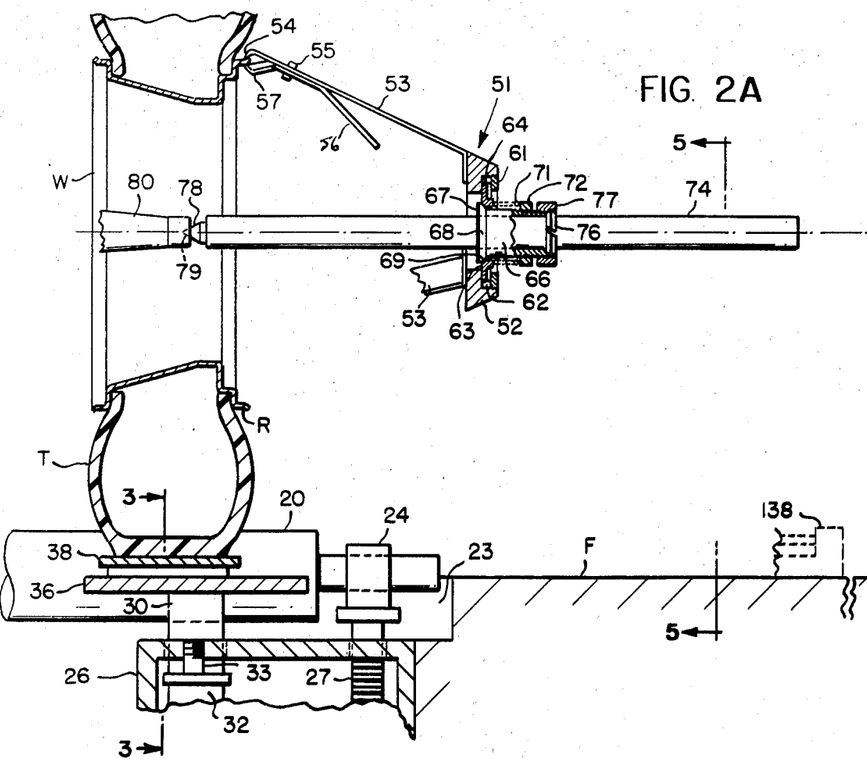
FIGS. 2A and 2B are enlarged fragmentary sectional views taken along the line 2—2 in FIG. 1 looking in the direction of the arrows.
Figure 2B:
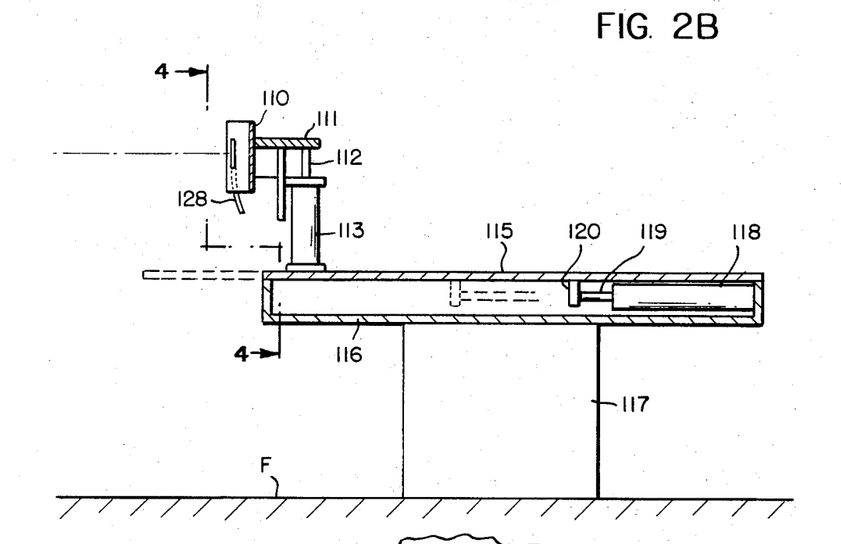

The tire pads 38 may be positioned approximately as illustrated in FIGS. 1 to 3, so that when the automotive vehicle is driven onto the apparatus, its two front tires T will rest directly on the pads 38. Then the cylinders 32 can be operated to lower the pads 38, and elevate the roller blocks 24 until the rollers 20 and 21 engage and support the tires T, as shown in broken lines in FIG. 5.

At this time a wheel clamp 51 is secured releasably to the outside rim R of each front wheel W (FIGS. 2A and 5) of the vehicle. Each clamp 51 comprises a hollow, truncated conical hub or collar 52 having attached to its base at equi-angularly spaced points thereabout three, elongate, metal straps 53, which project in equiangular relation from the collar 52 in extension of its outer surface. At its free end each strap 53 has a laterally bent lip portion 54 (FIG. 2A), which engages over the outer rim R of a wheel W. Pivotally attached intermediate its ends by a pin 55 to each strap 53 adjacent its free end is a pivotal latching lever 56, which also has at one end a laterally bent lip portion 57 (FIG. 2A). When the lips 54 of clamps 51 have been inserted over the outer rim R of a wheel W, the associated levers 56 are pivoted to clamping positions (FIG. 2A) so that the clamp 51 is secured releasably to the wheel W for rotation therewith.

Held by a ring nut 61 (FIG. 5), that is threaded in a counterbore 62 in each clamp collar 52, is an annular clutch plate 63. This plate has a plurality of radial slots which divide it into a plurality of equi-angularly spaced, resilient fingers 64, which project into the space between the ring nut 61 and the bottom of the counterbore 62. Alternate fingers 64 of each clutch plate 63 are bent axially in opposite directions, thereby resiliently and frictionally to engage confronting surfaces of the associated collar 52 and ring nut 61, so that each clutch plate 63 is frictionally coupled to its associated collar 52 for rotation therewith. Also, the outer diameter of the hub portion of each plate 63 is smaller than the inner diameter of the surrounding nut 61, so that each plate 63 can be shifted slightly radially relative to its collar 52 as noted hereinafter.

Mounted in the bore of each clutch plate 63 is a sleeve coupling member 66 (FIG. 2A) which on one end has an external, circumferential shoulder 67 that has on its outer face a rounded bearing surface 68. Each coupling member 66 is clamped resiliently against the complementary surface of the associated clutch 63 by a coil spring 71. Each spring 71 surrounds the associated sleeve 66 between the associated clutch plate 63, and an adjustable ring nut 72 that is threaded onto each sleeve 66. The mating surfaces 68 and 69 permit limited rocking movement of each sleeve 66 relative to the associated clutch plate 63.

Mounted intermediate its ends for axial adjustment in the bore of each sleeve 66 is an elongate, tubular optical shaft 74. Each shaft 74 is secured adjustably in the bore of its associated coupling 66 by a split ring clamp 76, which slides on the associated shaft 74, and which is secured in locking engagement therewith by a cap nut 77 that threads on the associated coupling 66. In the inner end thereof each shaft 74 carries a centering pin 78 (FIGS. 2A and 6) having a conical point that seats in the usual conical recess 79 provided in the outer end of each steering spindle 80 of the vehicle for centering the spindle on a lathe during machining of the spindle. When a clamp 51 has been mounted upon one of the wheels W, the cap nut 77 on the associated coupling element 66 is backed off or unthreaded to release the associated shaft 74, which is then shifted axially until its centering pin 78 is seated snugly in the recess 79 of one wheel spindle of the vehicle whose wheel alignment is to be tested. The cap nut 77 is then threaded back to its shaft-locking position so that the shaft 74 is now secured by its clamp 51 to a wheel W.

Figure 6:
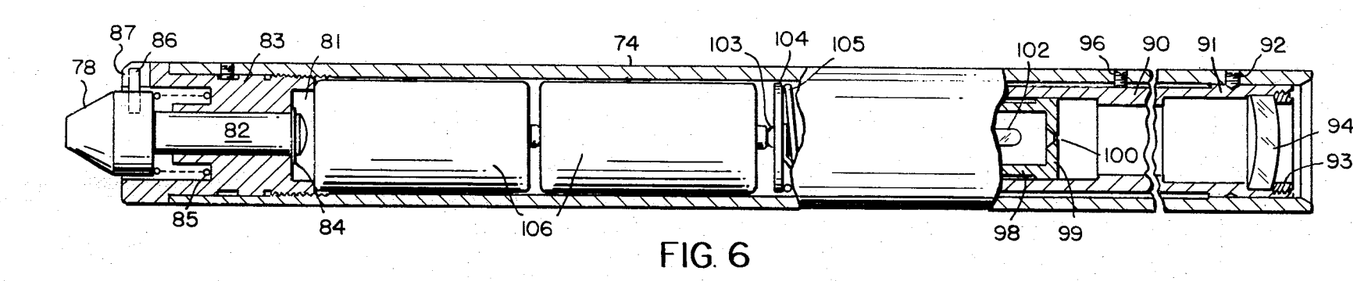
FIG. 6 is an enlarged, fragmentary sectional view taken along the line 6—6 in FIG. 5 looking in the direction of the arrows.

As shown more clearly in FIG. 6, each centering pin 78 has a shank 82 slidable in the bore of a plug 83 that is threaded into one end of the associated tubular shaft 74. A coiled compression spring 85, which is seated at one end in a recess in the front end of the plug 83, and at its opposite end against the head of the pin 78, resiliently urges the latter into an extended position, but outward movement of each pin is limited by a washer 84 on the inner end of its shank which engages the bottom of a counterbore 81 in the inner end of the plug 83. A radial pin 86 carried by the head portion of each pin 78 extends into an axially extending notch 87 formed in the outer end of the associated plug 83 to prevent rotation of the centering pin 78 relative to its shaft 74.

Mounted in the outer end of each shaft 74 substantially coaxially thereof is an elongate sleeve 90. On its outer end each sleeve 90 has an enlarged-diameter head 91; and each sleeve is secured against axial movement in its shaft 74 by a set screw 92. Secured by a ring nut 93 in the bore of each head portion 91 is a lens 94. The main portion of each sleeve 90 has an outside diameter slightly less than the diameter of the bore of the associated shaft 74, and is engaged by three screws 96, which support the shank of each sleeve 90 in radially spaced relation to the bore wall of the associated shaft.

Secured adjacent the inner end of each sleeve 90 coaxially thereof is a hollow nipple 98, having a transverse end wall 99 that has a central hole 100. Mounted in each nipple 98 is a conventional light bulb 102 of the flashlight variety, for example. This bulb is connected electrically to a contact 103, which is secured in the center of a movable disc 104 that is disposed in the associated shaft 74 rearwardly of its nipple 98. A coiled compression spring 105 in each shaft 74 urges the disc 104 axially toward the end of the shaft containing the plug 83, thereby maintaining the contact 103 resiliently engaged with the contact of the inner one of a pair of conventional, dry cell batteries 106 that are removably mounted in each shaft 74 between the disc 104 and the inner end of its associated plug 83.

Normally, as shown in FIG. 6, each spring 85 urges the associated centering pin 78 to its inactive or outer position, in which the inner end of its shank 82 is disposed within the counterbore 81 of the associated plug 83 in spaced relation to the adjacent battery 106. However, when each shaft 74 is mounted by its clamp 51 onto a wheel W, the spindle 80 associated with the wheel urges the associated centering pin 78 inwardly until its inner end engages and grounds the bottom of the adjacent battery 106, thereby completing the electrical circuit to the associated bulb 102, so that this bulb becomes illuminated to direct a beam of light through the adjacent aperture 100 and the registering lens 94 out of the associated shaft 74.

Figure 4:
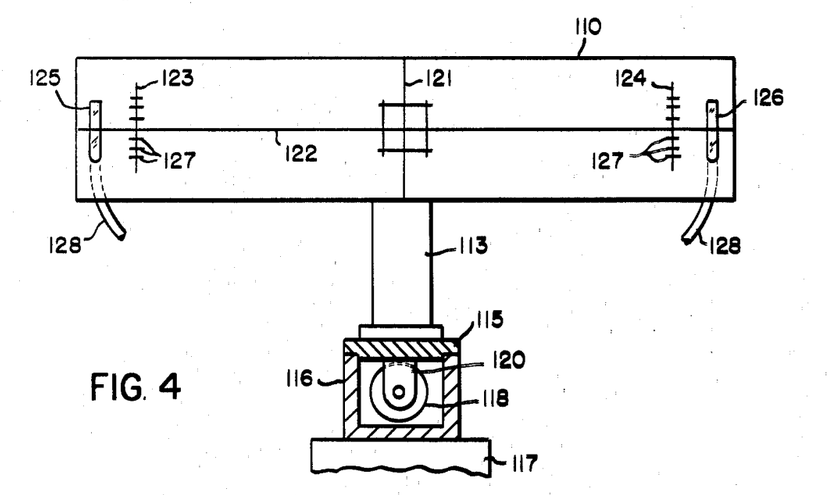
FIG. 4 is an enlarged, fragmentary sectional view taken along the line 4—4 in FIG. 2B looking in the direction of the arrows.

Adjustably mounted on the floor F outwardly of the rollers 20 and 21 and shaft 74 to register with the light beams emanating from the shafts 74 are two, identical, concavedly shaped charts or screens 110 (FIGS. 1 and 2A). Each chart 110 is fastened to a bracket 111, which is secured to the upper end of a piston 112 that reciprocates in a vertically disposed cylinder 113 (FIGS. 2B and 4). Each cylinder 113 is secured at its lower end on a slide 115 that slides on an elongate, stationary cylinder housing 116 for horizontal reciprocation. Each housing 116 is fastened by a block 117 to the floor F, and contains a cylinder 118. A piston rod 119, which projects from each cylinder 118 into the bore of the associated housing 116, is fastened to a lug 120, which projects from the underside of the associated slide 115. Each rod 119 is reciprocable to shift the associated slide 115 and chart 110 toward or away from the ends of the adjacent rollers 20 and 21.

Medially of its ends the concave face of each chart 110 has a zero "toe" reference line 121 (FIG. 4), which is disposed to lie in a vertical plane that extends medially between the rollers 20 and 21. At opposite sides of line 121 each chart 100 has on its face a plurality of vertically disposed lines representative of the degree of "toe-in" or "toe-out" of a particular wheel, Between its upper and lower edges the face of each chart 110 also has thereon a plurality of horizontally disposed reference lines for measuring wheel "camber," including a zero camber line 122 (FIG. 4), which bisects the associated reference line 121 at right angles; and adjacent opposite ends thereof the face of each chart has thereon vertical reference lines 123 and 124 (FIG. 4), which are used to check the turning radius of the wheels W under test. The spaced graduations 127, which extend transverse to each reference line 123 and 124, are used to determine the caster of the tested wheels.

Mounted on the face of each chart 110 outwardly of its two reference lines 123 and 124, are two, transparent, tubular level indicators 125 and 126, the lower ends of which are connected to each other by a flexible tube or conduit 128. Each tube 128 is filled with a colored liquid for determining whether or not the chart, and hence its reference line 122, are properly positioned horizontally.

After the two shafts 74 have been clamped onto the front wheels W as illustrated in FIG. 1, hydraulic fluid is fed, if necessary, to the cylinders 118 to shift each chart 110 either toward or away from the associated shaft 74 until the light beams from bulbs 102 are properly focused on the faces of the charts by the lenses 94. The charts 110 can also be tilted manually relative to their brackets 111, if necessary, to place their reference lines 122 horizontally, as evidenced by the levels 125, 126. Then each shaft 74 is pivoted or shifted manually relative to the attached spindle 80 until the shaft is disposed horizontally, as determined, for example, by a conventional level (not illustrated). Then the cylinder 113 for the associated chart 110 is actuated to shift the chart vertically until its line 122 registers with the beam of light emanating from the associated shaft 74, which is now level.

After establishing the proper positions of charts 110, an electric motor (not illustrated), which is connected through a gear box 130 (FIG. 1) and belts 131 to pulleys on one end of roller 20, is energized to rotate roller 20 at a desired speed. Roller 20 in turn imparts its rotation through the tires T to the idler roller 21 and through the clamps 51 to the shafts 74. Assuming that the spindles 80 initially are not in axial alignment the recessed end of a spindle 80 functions as a fulcrum, causing the pointed end 78 of the associated shaft 74 to pivot about the axis of the spindle so that the beam of light emanating from its shaft will trace a curvelinear path on the confronting face of the associated chart 110. This limited pivotal movement of each shaft 74 is permitted by the bearing surfaces 68 and 69 (FIG. 2A) on the associated coupling shoulder 67 and clutch disc 63, respectively.

In order properly to align each shaft 74 with its associated spindle 80, two identical, pivotal arms 135 (FIGS. 1 and 5) are provided. These are mounted at their lower ends for pivotal and axial adjustment on stationary rocker shafts 136, which are carried by blocks 138 on the floor F outside the rollers 20 and 21. Each arm 135 is pivotal manually from an inoperative position in which it rests on the floor F (FIG. 1) to an operative position (FIG. 5) in which it projects vertically upward at one side of the associated shaft 74. In this latter position, a leaf spring 140, which is fastened at its lower end to the inside of each arm 135, has its upper, free end engaged with the outer peripheral surface of the adjustment shaft 74. A setscrew 142 (FIG. 5), which is threaded through the upper end of each arm 135, is engageable with the free end of the associated leak spring 140 to adjust the tension of the spring on the shaft.

Figure 5:
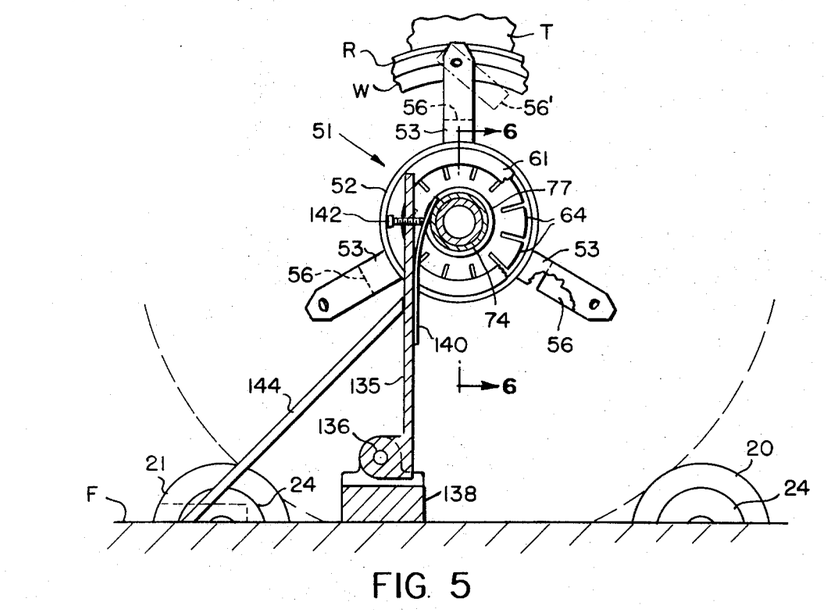
FIG. 5 is a fragmentary sectional view taken along the line 5—5 in FIG. 2A looking in the direction of the arrows.

An operating lever 144 is pivotally connected at one end to one side of each lever 135; and is slidably engageable at its opposite end with the floor F to support the associated arm 135 in its vertical or active position (FIG. 5).

When one of the arms 135 is in its operative position, an operator may press his or her foot on the inclined lever 144 (FIG. 5) so that radial pressure is applied through the associated arm 135 and its spring 140 to the peripheral surface of the rotating shaft 74, thereby causing the associated clutch plate 63 to be shifted radially in its clamp collar 52 until the beam of light projected by this shaft 74 forms a single, stationary point on the face of the registering chart 110. When this occurs, the operator will know that the axis of the radially adjusted shaft 74 is in registry with the axis of the spindle 80 to which it is attached, and that the light beam is now representative of the axis of the associated spindle 80. To the extent that this beam of light falls either to one side or the other of the vertical reference line 121 on a chart 110, the operator will known that the associated spindle 80 is "toeing" in or out; and to the extent that this beam falls above or below the reference line 122 of the chart, the operator will know that the associated turning spindle 80 has a positive or negative camber, depending upon whether the beam falls above, or below, respectively, line 122.

By maintaining a predetermined distance or setting between a chart 110 and the lens 94 in the associated optical shaft 74, the horizontal and vertical reference lines on the charts 110 can be calibrated to represent, e.g., degrees of camber and toeing of the tested wheels. If the positions of the light beams on charts 110 indicate that the spindles 80 require adjustment, the operator makes the necessary adjustments in conventional manner to bring the axes of the spindles, as represented by the light beams from shafts 74, into registry, or near registry, with the desired horizontal and vertical reference lines on each chart.

After the spindles 80 have been adjusted for proper camber and toe, the cylinders 32 may be actuated to lower the rollers 20 and 21, and to elevate the tire pads 38 into reengagement with the tires T. Then the steering wheel can be turned in opposite directions to cause the light beams from the shafts 74 to swing about vertical axes to determine from the charts 110 the turning radius and caster of each spindle 80. Each spindle should be pivotal from its normal position in opposite directions far enough for the associated light beams to reach, for example, the turning radius reference lines 123 and 124, and the caster reference lines 127, that are located at opposite ends of each chart. If the turning radius or caster of a wheel is improper, the operator then makes the necessary conventional adjustment to correct this fault.

When the spindles 80 have been provided with the proper camber and toe, and there is no need for further testing, the clamps 51 are removed from the wheel rims R merely by swinging the levers 56 to their released positions as illustrated at 56' in FIG. 5. As soon as one of the shafts 74 is withdrawn from a wheel W, its spring-loaded centering pin 78 returns to its outermost position (FIG. 6) and interrupts the circuit to the associated bulb 102, which then becomes deenergized. The front wheels of the vehicle are then backed off from the rollers 20 and 21, and the apparatus is ready for testing another set of wheels.

Figure 7:
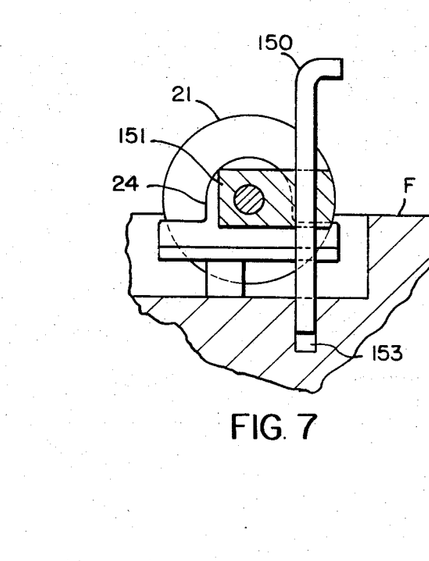
FIG. 7 is a fragmentary sectional view taken on a vertical plane through one end of one of the wheel supporting rollers for the purpose of illustrating a device for selectively locking this roller against rotation.

In the event that it is necessary to test the alignment of a vehicle having front wheel drive, it is desirable to lock the roller 21 against rotation, so that the vehicle's front wheels can be used to drive the front end of the vehicle into or out of testing position on the rollers 20 and 21. For this purpose a pin 150 (FIG. 7) is inserted manually through an opening formed in a bar 151, which is fastened to one end of the roller 21, and into a registering recess 153 in the floor F, thereby releasably securing roller 21 against rotation.

When the apparatus is originally installed, or whenever it is necessary to adjust the rollers 20 and 21, it is essential that they be placed exactly parallel to one another, and that the charts 110 be supported so that their vertical reference lines 121 register exactly with the midpoint of the space between rollers 20 and 21. To maintain this proper relationship, a plurality of identical sections 160 (FIGS. 8 and 9) of channel iron are used, which have identical, flat plates or spacers 162 secured to the outsides of their web portions. The plates 162 are disposed in spaced, parallel planes, which are separated from one another by a distance equal to the desired space between the rollers 20 and 21. Along its upper edge each section 160 has therein a V-shaped notch 164 the center of which is equispaced between the associated spacer plates 162.

Figure 8:
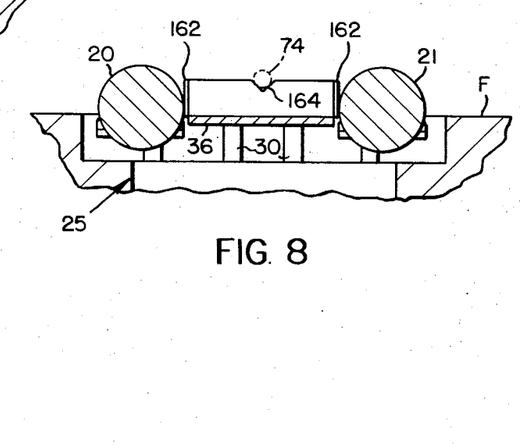
FIG. 8 is a fragmentary sectional view generally similar to FIG. 3, but illustrating on the tire pad, instead of a tire, a gauge for accurately setting the tire supporting rolls relative to one another.
Figure 9:
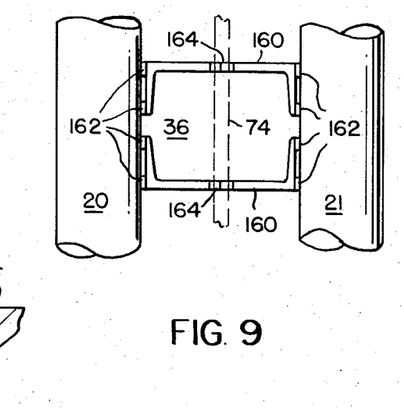
FIG. 9 is a fragmentary plan view of that portion of the apparatus illustrated in FIG. 8.

In use, and before mounting the tire pads 38 on the platform 36, or after removal of the pads 38 from the platforms 36, a pair of the channel sections 160 is mounted on each platform 36 in the manner illustrated in FIGS. 8 and 9, so that the edges of the web portions of the two sections are disposed in spaced, confronting relation to one another. Then, the two rollers 20 and 21, are positioned with their peripheral surfaces engaged with the spacer plates 162 at opposite ends, respectively, of each section 160. Thus, the two rollers 20 and 21 are accurately positioned parallel to one another before being secured to the racks 27. Then, or after the rollers 20 and 21 have been secured in place, and before removal of sections 160 from the platforms 36, the two light shafts 74 are placed on the channel sections 160, so that each shaft (broken lines in FIGS. 8 and 9) is supported in the two notches 164 of each pair of sections 160. The shafts 74 are thus disposed coaxially of one another, and are located midway between the two rollers 20 and 21. Then by illuminating the bulbs 102 in the shafts 74, the two charts 110 can be properly located, at least with respect to their vertical reference or centerlines 121, by positioning each chart so that the light beam from the associated shaft 74 falls directly on the reference line 121 of the chart, regardless of the position of the associated slide 115. The associated cylinder housing 116 is then fixed relative to the floor F, so that the reference line 121 on the associated chart 110 will be in registry with the midpoint of the space separating the rollers 20 and 21.

When the apparatus is first installed, it may be impossible during a test to focus a beam of light to produce a stationary light spot on a chart 110, regardless of how the associated shaft 74 is manipulated radially by the associated adjusting lever 135. This may be because of improper registry between a lens 94 and its associated bulb 102. To correct this, the three set screws 96 of a shaft 74 may be adjusted to swing the inner end of the associated tube 90 relative to its outer end until the projected beam of light on the registering chart 110 finally stops moving.

From the foregoing it will be apparent that the instant invention provides relatively simple and extremely accurate means for checking the front wheel alignment of a vehicle while the latter is being subjected to normal operating conditions. When the front wheels of a vehicle are supported on rolls 20 and 21, and the rolls are rotated, they automatically position and hold the wheels in straight-forward positions and allow the toe and camber of each wheel to be read even while the driver is seated in the vehicle. The rollers also hold the front wheels in registry with the turning pads 38, so that when the latter are elevated, the wheels are in position for testing radius and caster.

Among the other advantages of this novel apparatus is that it enables one to align directly the front spindles of vehicles instead of using the wheels as a reference, thus eliminating the inaccuracies of readings taken from the wheels, so that the amount of wobble in a wheel is immaterial during a test. It also enables a direct reading of the alignment of spindles on calibrated screens without any distortion or amplification through prisms or mirrors. Moreover, the light shafts provide relatively simple and accurate means for providing optical extensions of the front wheel spindles. Each such extension uses the lathe center of a spindle as one bearing, and a universal slide friction bearing employed in the specially designed clamp 51 as the outboard bearing. Also, the lever mechanism 135, 144 permits one to push on the end of the optical shaft while it is rotating and bring it to a position coaxially of the spindle. It will be noted also that the wheel holder or clutch holder 51 concentricity with the wheel has no effect on being able to true the optical shaft.

The function of the universal clamp or wheel holder 51 is that it provides an outboard bearing for the associated optical shaft 74, and since the outboard bearing is locatable by means of the universal slide friction bearing 63, it is completely unessential for this holder to run concentric with the wheel to which it is attached. It is completely unessential for the face of the holder to be parallel with the wheel. Moreover, the holder is designed to lock onto the optical shaft in any position to compensate for the difference in wheel size. Since the concept of this machine permits it to read the spindle position directly and irrespective of the wheel wobble, and since the readings are made on a calibrated chart mounted in a plane perpendicular to the axis of the rollers, camber and toe are read simultaneously. The ability to read toe and camber simultaneously affords the opportunity visually to observe the integral of the toe-camber relationship.

While the invention has been described in connection with a specific embodiment thereof, it will be understood that it is capable of further modification; and

Having thus described our invention, what we claim is:

1. Apparatus for checking the alignment of the front wheel spindles of an automotive vehicle, comprising
   a pair of spaced charts,
   means for supporting the two front wheels of a vehicle for rotation about their spindles between said charts,
   a pair of shafts,
   a light source mounted in a recess in each shaft to project a beam of light outwardly from one end of said shaft,
   means for releasably clamping said shafts to said wheels of rotation therewith, and with the opposite ends of said sahfts pivotally mounted on the adjacent ends of the associated wheel spindles, and with said shafts positioned to project beams of light from said sources therein toward the adjacent charts, and
   said clamping means including means adjustably supporting each of said shafts intermediate its ends for pivotal movement about said opposite end thereof, when the shaft is clamped to one of said wheels, and
   means operable during the rotation of said shafts by said wheels selectively to adjust said adjustable supporting means thereby to pivot each of said shafts about said opposite ends thereof until the light beams from said sources project stationary points of light on said charts.

2. Apparatus for checking the alignment of the front wheel spindles of an automotive vehicle, comprising
   a pair of spaced charts,
   means for supporting the two front wheels of a vehicle for rotation about their spindles between said charts,
   a pair of shafts,
   a light source mounted in a recess in each shaft to project a beam of light outwardly from said shaft,
   means for releasably and adjustably clamping one of said shafts to each of said wheels with one end thereof pivotally mounted on the adjacent end of the associated wheel spindle, and with said shaft positioned to project a beam of light from said source therein toward the adjacent chart, and
   adjusting means operable during the rotation of said shafts by said wheels to pivot each of said shafts about said one end thereof until the light beams from said sources project stationary points of light on said charts,
   said supporting means comprising a pair of spaced, parallel rotatable rollers mounted between said charts to support said two front wheels rotatably, and
   said adjusting means comprising a pair of members mounted adjacent opposite ends, respectively, of said rollers for pivotal movement transversely of said rollers and into engagement with said shafts to apply pressure radially thereagainst, when said shafts are rotating with said wheels.

3. Apparatus for checking the alignment of the front wheel spindles of an automotive vehicle, comprising
   a pair of spaced charts,
   means for supporting the two front wheels of a vehicle for rotation about their spindles between said charts,
   a pair of shafts,
   a light source mounted in a recess in each shaft to project a beam of light outwardly from said shaft,
   means for releasably and adjustably clamping one of said shafts to each of said wheels with one end thereof pivotally mounted on the adjacent end of the associated wheel spindle, and with said shaft positioned to project a beam of light from said source therein toward the adjacent chart, and
   adjusting means operable during the rotation of said shafts by said wheels to pivot each of said shafts about said one end thereof until the light beams from said sources project stationary points of light on said charts,
   said clamping means comprising a pair of annular members,
   a plurality of straps fixed at one end to each said member and projecting from the associated member at angularly spaced points thereabout,
   releasable clamps on the opposite end of each strap engageable with the rim on one of said wheels releasably to support said members in spaced, confronting relation to the spindle of the associated wheel, and
   means on each annular member for releasably securing one of said shafts intermediate its ends in each annular member with the associated shaft seated in a centering recess in the associated wheel spindle, the last-named means including frictional coupling means supporting each shaft intermediate its ends for rotation with the associated annular member and wheel, and for limited movement radially of the bore in the associated annular member by said adjusting means.

4. Apparatus for checking the alignment of the front wheel spindles of an automotive vehicle, comprising
   a pair of spaced charts,
   means for supporting the two front wheels of a vehicle for rotation about their spindles between said charts,
   a pair of shafts,
   a light source mounted in a recess in each shaft to project a beam of light outwardly from said shaft, means for releasably and adjustably clamping one of said shafts to each of said wheels with one end thereof pivotally mounted on the adjacent end of the associated wheel spindle, and with said shaft positioned to project a beam of light from said source therein toward the adjacent chart, and
   adjusting means operable during the rotation of said shafts by said wheels to pivot each of said shafts about said one end thereof until the light beams from said sources project stationary points of light on said charts,
   a normally-open switch mounted in each shaft and operative, when closed to energize the associated light source in the shaft,
   a centering pin mounted in said one end of each shaft for limited movement axially thereof, and having a pointed end projecting from said one end of the associated shaft for engagement in the centering recess in one of said spindles, a spring in each shaft urging the associated centering pin axially outwardly from said one end of the shaft to a first limit position, each pin being movable inwardly against the resistance of said spring to a second limit position in which it closes said switch, and said clamping means including means operative, when said shafts are clamped to said wheels, to hold said centering pins releasably in their second limit positions.

5. Apparatus for checking the alignment of the front wheel spindles of an automotive vehicle, comprising a pair of spaced, confronting charts, each having on its face a horizontal reference line, and a vertical reference line intersecting the horizontal line at right angles, a pair of spaced, parallel rollers for rotatably supporting the two front wheels of a vehicle between said charts with the spindles of said wheels facing said charts and the reference lines thereon, a pair of clamps releasably attachable to the rims of said wheels for rotation therewith, a pair of lamps, means adjustably supporting said lamps on said clamps for rotation therewith between said spindles and said charts, and for projecting rotating beams of light onto said charts when said wheels are rotated, and means operable during the rotation of said lamps for adjusting said adjustable supporting means, thereby to move said lamps relative to said wheels to position the beam of light from each lamp coaxial of the axis of the associated wheel spindle, whereby said beams form on said charts stationary points of light that are offset from the intersections of said reference lines in proportion to the camber and toe of said wheels, said adjustable supporting means being operative to support said lamps adjustably on said clamps for limited pivotal movement by said adjusting means universally of the axes of said spindles.

6. Apparatus as defined in claim 5, including driving means for rotating one of said rollers, means mounting the other of said rollers for rotation parallel to said first roller, and for tangential engagement with said wheels, whereby the rotation of said one roller is transmitted to said other roller by said wheels, and means for releasably locking said other roller against rotation.

7. Apparatus for checking the alignment of the front wheel spindles of an automotive vehicle, comprising a pair of spaced, confronting charts, each having on its face a horizontal reference line, and a vertical reference line intersecting the horizontal line at right angles, a pair of spaced, parallel rollers for rotatably supporting the two front wheels of a vehicle between said charts with the spindles of said wheels facing the charts and the reference lines thereon, a pair of lamps for projecting beams of light onto said charts, means for releasably mounting said lamps on said wheels for rotation thereby between the associated wheel spindle and the adjacent chart, and means operable during the rotation of said lamps for adjusting said lamps relative to said wheels to position the beam of light from each lamp coaxial of the axis of the associated wheel spindle, whereby said beams form on said charts stationary points of light that are offset from the intersections of said reference lines in proportion to the chamber and toe of said wheels, said mounting means comprising a pair of clamps releasably attachable to the rims of said wheels for rotation therewith, and releasably attachable to said lamps to support said lamps adjustably on said wheels for limited pivotal movement universally of the axes of said spindles, a plurality of spacer members removably insertable between said rollers to check the space therebetween, each of said members having a length corresponding to the desired distance between said rollers, and means for releasably supporting said lamps on said members with the beams thereof disposed coaxially and medially of the space between said rollers thereby to register with the vertical reference lines on said charts when the latter are properly positioned.

8. Apparatus for checking the alignment of the front wheel spindles of an automotive vehicle, comprising a pair of spaced, confronting charts, each having on its face a horizontal reference line, and a vertical reference line intersecting the horizontal line at right angles, a pair of spaced, parallel rollers for rotatably supporting the two front wheels of a vehicle between said charts with the spindles of said wheels facing the charts and the reference lines thereon, a pair of lamps for projecting beams of light onto said charts, means for releasably mounting said lamps on said wheels for rotation thereby between the associated wheel spindle and the adjacent chart, and means operable during the rotation of said lamps for adjusting said lamps relative to said wheels to position the beam of light from said lamp coaxial of the axis of the associated wheel spindle, whereby said beams form on said charts stationary points of light that are offset from the intersections of said references lines in proportion to the camber and toe of said wheels, said mounting means comprising a pair of clamps releasably attachable to the rims of said wheels for rotation therewith, and releasably attachable to said lamps to support said lamps adjustably on said wheels for limited pivotal movement universally of the axes of said spindles, said supporting means for each lamp comprising a shaft having a pointed end insertable releasably into a centering recess in the end of a wheel spindle to guide the shaft for pivotal movement about the axis of the spindle, an electric bulb mounted in a recess in the opposite end of each shaft, a lens mounted in said opposite end of each shaft in spaced, coaxial relation to the bulb therein to focus light from the bulb into a beam directed toward one of said charts, a pair of rotatable supports mounted between said rollers for limited vertical movement selectively into and out of engagement with the undersides of the wheels supported on said rollers, selectively to support said wheels on said supports above said rollers, and a plurality of graduations on the faces of said charts adjacent opposite ends thereof for registry with said light beams to measure the turning radius of the associated wheel, when the latter is supported on said supports and turned in opposite directions by the steering wheel of the associated vehicle.

9. A clamp for releasably securing a lamp to the front wheel of an automotive vehicle to check the alignment thereof, comprising:

a first member having therethrough a central opening, a plurality of straps secured at one end to said first member at angularly spaced points thereabout and releasably attachable at their opposite ends to the rim of a wheel to support said first member in spaced registry with said wheel, a circular clutch plate having an outer, marginal, circumferential portion thereof frictionally seated in an annular recess formed in the bore of said first member coaxially thereof, and having an axially bored, central hub portion registering with the bore in said first member, a tubular chuck mounted in the bore of said clutch plate and having an external circumferential shoulder seated against one end of said hub portion, a spring interposed between said chuck and the opposite end of said hub portion resiliently to urge said external shoulder against said hub portion normally to support said chuck coaxially in the bore of said clutch plate, and means for releasably securing a lamp in the bore of said chuck coaxially thereof, said clutch plate having an outer diameter smaller than the diameter of said annular recess in said first member, whereby said plate is frictionally slidable radially in said annular recess, and said external shoulder having thereon a segmental spherical surface engaged with a corresponding surface on said one end of said hub portion of said clutch plate, whereby, said chuck has limited universal movement relative to said clutch plate.

10. A lamp unit adapted to be clamped releasably to the front wheel of an automotive vehicle for pivotal movement about the axis of the wheel spindle for testing the wheel alignment of the vehicle, comprising a tube, a lens mounted in one end of said tube, a centering pin mounted in the opposite end of said tube for limited axial movement, and having a pointed end projecting from said tube for engagement with a centering recess in the wheel spindle of an automotive vehicle, a spring in said tube urging said pin axially outwardly to a first limit position, said pin being movable inwardly to a second limit position against the resistance of said spring, when said lamp is clamped in operative position on a wheel, an electric light bulb mounted in said tube rearwardly of said lens and in registry therewith, an electric power source mounted in said tube, and means including a normally-open switch positioned in said tube to be closed by said pin upon movement of said pin to said second limit position, and operative to connect said bulb to said power source, when said switch is closed, to project light through said lens.

* * * * *